United States Patent [19]

Watanabe et al.

[11] Patent Number: 4,720,793

[45] Date of Patent: Jan. 19, 1988

[54] METHOD AND APPARATUS FOR CONTROLLING DRIVE FORCE OF A VEHICLE EQUIPPED WITH CONTINUOUSLY VARIABLE TRANSMISSION

[75] Inventors: Tomoyuki Watanabe; Takashi Shigematsu; Setsuo Tokoro; Takashi Hayashi, all of Susono, Japan

[73] Assignee: Toyota Jidosha Kabushiki Kaisha, Aichi, Japan

[21] Appl. No.: 779,679

[22] Filed: Sep. 24, 1985

[30] Foreign Application Priority Data

Sep. 25, 1984 [JP] Japan ................................ 59-199879

[51] Int. Cl.$^4$ ........................ B60K 41/18; F16H 9/12; G05D 15/01
[52] U.S. Cl. ................................. 364/424.1; 74/865; 74/866
[58] Field of Search ............... 364/424.1; 74/865, 866, 74/867

[56] References Cited

U.S. PATENT DOCUMENTS

| | | | |
|---|---|---|---|
| 4,458,560 | 7/1984 | Frank et al. | 74/866 X |
| 4,459,878 | 7/1984 | Frank | 74/866 X |
| 4,507,986 | 4/1985 | Okamura et al. | 74/866 |
| 4,515,040 | 5/1985 | Takeuchi et al. | 74/866 |
| 4,546,673 | 10/1985 | Shigematsu et al. | 74/866 |
| 4,580,465 | 4/1986 | Omitsu | 74/866 |
| 4,584,907 | 4/1986 | Niwa et al. | 74/866 |
| 4,590,561 | 5/1986 | Abo et al. | 364/424.1 |
| 4,593,581 | 6/1986 | Omitsu | 74/866 |
| 4,594,916 | 6/1986 | Ito et al. | 74/866 |

Primary Examiner—Felix D. Gruber
Attorney, Agent, or Firm—Parkhurst & Oliff

[57] ABSTRACT

The disclosed apparatus controls an actual drive force of an automotive vehicle equipped with a continuously variable transmission for transmitting an output of an engine to drive wheels. The apparatus includes an output detector for detecting a currently required output of the vehicle; a speed detector for detecting a current speed of the vehicle; a first device for determining a target drive force of the vehicle based on the detected currently required output and the detected current speed of the vehicle, and according to a predetermined relation among the target drive force, the currently required output and the current speed of the vehicle; and a second device for determining the actual drive force of the vehicle. An adjusting device compares the determined target drive force with the determined actual drive force and controls the output of the engine and/or a speed ratio of the transmission, so that the actual drive force of the vehicle coincides with the determined target drive force.

11 Claims, 22 Drawing Figures

S11: INTERRUPTION REQUEST FROM CPU 0?

S21: INTERRUPTION REQUEST FROM CPU 0?

METHOD AND APPARATUS FOR CONTROLLING DRIVE FORCE OF A VEHICLE EQUIPPED WITH CONTINUOUSLY VARIABLE TRANSMISSION

BACKGROUND OF THE INVENTION

1. Field of the Art

The present invention relates in general to a method and an apparatus for controlling a drive force of an automotive vehicle equipped with a continuously variable transmission, and more particularly to techniques for improving drivability of such a vehicle.

2. Related Art Statement

In an automotive vehicle equipped with a continuously variable transmission for transmitting the output of an engine to drive wheels, the speed ratio of the transmission, and the output of the engine if necessary, may be adjusted so that the engine may be operated to meet a minimum fuel-consumption curve or maximum fuel-economy curve which represents a relation between the output torque and speed of the engine. Hence, the vehicle provides a relatively high level of fuel economy. An example of an apparatus to control such engine and transmission is disclosed in Japanese Patent Application No. 57-40747 laid open in 1983 under Publication No. 58-160661.

3. Problem Solved by the Invention

While such a conventional control apparatus enables the vehicle to provide a high fuel economy, the apparatus is not capable of providing a satisfactorily high degree of drivability while the engine is operating in a transient state (e.g., while the vehicle is accelerated), because the conventional control arrangement is adapted to control the speed ratio of the continuously variable transmission and other variables, based on the characteristics of the engine which appear while the engine is operating in a steady state. In other words, the conventional arrangement is not capable of controlling a rate of variation in the speed ratio of the transmission so as to assure a high level of drivability while the engine is in a transient operating state, that is, the timing to change the speed ratio of the transmission tends to be too early or too late to meet the requirement for attaining the satisfactory drivability. For example, if the speed ratio "e" is changed at a relatively high rate, a time (t0-t1) between the start (t0) of operation of a throttle valve and the moment (t1) at which a desired drive force is obtained, may be reduced accordingly, as indicated in FIG. 19. However, the drive torque is not sufficient during this period of time. Therefore, the operator of the vehicle feels, at an initial stage of acceleration of the vehicle, a poor response of the engine to the operation of an accelerator pedal to accelerate the vehicle, and tends to depreciate the drivability of the vehicle. In FIG. 19, a broken line near a solid-line curve indicating the drive torque T represents an ideal curve for obtaining the desired drivability, and a broken line near a solid-line curve indicating the input shaft torque Ti of the transmission represents a required output torque Te of the engine which corresponds to the operating amount of the accelerator pedal of the vehicle.

On the other hand, if the speed ratio "e" of the continuously variable transmission is changed at a relatively low rate as indicated in FIG. 20, the drive torque immediately after the start (t0) of the throttle valve is relatively high. However, a time (t0-t2) after the start of the throttle valve movement is extended until the desired drive torque is obtained. Therefore, the operator feels a limited acceleration capability, and is apt to depreciate the drivability of the vehicle.

The unfavourable phenomena indicated above referring to FIGS. 19 and 20 may be explained as follows:

The drive torque To of the vehicle is expressed by the following equation:

$$To(t) = Ti(t)/e(t) = [Te(t) - I \cdot \dot{N}i]/e(t) \qquad (1)$$

where,

I: Moment of inertia of the engine and the input shaft of the transmission $\dot{N}i$: Acceleration of the input shaft of the transmission In the case of FIG. 19, the acceleration $\dot{N}i$ of the input shaft of the continuously variable transmission is increased as the speed ratio e(t) is rapidly varied. Consequently, a variation in the drive torque To is reduced. In the case of FIG. 20, the situation is reversed.

According to the conventional control apparatus, the drive torque of the vehicle will be reduced in proportion to a decrease of the engine performance or output or a decrease of the transmission efficiency of the transmission due to changes of their characteristics during a long service. Hence, the drivability will be degraded as the service period of the vehicle is prolonged.

SUMMARY OF THE INVENTION

It is accordingly an object of the present invention to provide a method and an apparatus for controlling a drive force of a vehicle equipped with a continuously variable transmission, which method and apparatus enable the vehicle to provide improved drivability.

According to the present invention, there is provided a method of controlling an actual drive force of an automotive vehicle equipped with a continuously variable transmission for transmitting an output of an engine to drive wheels, comprising the steps of: determining a target drive force of the vehicle based on a currently required output of the vehicle such as an operating amount of an accelerator pedal, and on a current speed of the vehicle, and according to a predetermined relation among the target drive force, the currently required output and the current speed of the vehicle; and controlling the output of the engine and/or a speed ratio of the transmission, so that the actual drive torque of the vehicle coincides with the determined drive force.

The controlling method of the invention described above may be suitably practiced by an apparatus comprising: output detecting means for detecting a currently required output of the vehicle; speed detecting means for detecting a current speed of the vehicle; first determining means for determining a target drive force of the vehicle based on the detected currently required output and the detected current speed of the vehicle, and according to a predetermined relation among the target drive force, the currently required output and the current speed of the vehicle; second determining means for determining the actual drive force of the vehicle; and adjusting means for controlling the output of the engine and/or a speed ratio of the transmission, so that the actual drive torque of the vehicle coincides with the determined drive force.

In the method and apparatus according to the invention described above, the output of the engine and/or the speed ratio of the continuously variable transmission is (are) controlled such that the actual drive force of the vehicle coincides with the target drive force which has been determined based on the currently required output of the vehicle and the current speed of the vehicle. Accordingly, the output of the engine and/or the speed ratio of the transmission is (are) changed in order to give the vehicle the target drive force, so as to assure improved drivability even while the vehicle is in a transient state.

Since the currently required output and current speed of the vehicle are detected and fed back to update the target drive force, the engine output and/or the speed ratio of the transmission which are controlled to meet the target drive force will not be affected by a decrease of the transmission efficiency of the transmission and a decrease of the engine performance. Consequently, the drive force and the speed of the vehicle are controlled with a high response to a variation in the currently required output, e.g., an amount of operation of an accelerator pedal.

According to an advantageous embodiment of the apparatus of the invention, the first determining means determines a reference drive force based on an operating amount of an accelerator pedal and the detected current speed of the vehicle, and adjusts the determined reference drive force based on at least one of quantities representing running conditions of the vehicle, the quantities including an operating speed of the accelerator pedal, an operating speed of a brake, a weight of the vehicle, and a grade of a road on which the vehicle runs. In this arrangement, the target drive force is obtained by adjusting the reference drive force in view of the operating speed of the accelerator pedal and/or the operating speed of the brake (brake pedal), and/or the vehicle weight and/or the road grade (angle of slope). Therefore, the target drive force of the vehicle and therefore the engine output and/or the speed ratio of the transmission may be controlled to meet the operator's intention to accelerate or decelerate the vehicle, which is reflected by the operating amount of the accelerator or brake pedal. Further, the target drive force may be compensated for a variation in the vehicle weight or road grade.

In a preferred form of the above embodiment, the first determining means further relies on at least one of a drive mode of the vehicle selected by a drive mode selector device, and an operating amount of a brake, in determining the reference drive force.

According to another advantageous embodiment of the invention, the controlling apparatus further comprises a torque sensor disposed in a power transmission line between an output shaft of the transmission and the drive wheels, and the second determining means determines the actual drive force of the vehicle based on a signal generated from the torque sensor.

According to a further embodiment of the invention, the second determining means determines the actual drive force of the vehicle based on a rate of change in the vehicle speed, i.e., on an acceleration of the vehicle.

In accordance with a still further embodiment of the invention, the second determining means determines the actual drive force of the vehicle based on at least two quantities selected from the group which consist of a speed of the engine, an amount of air supply to the engine, and an amount of fuel supply to the engine, and based on a rate of variation in the speed of the engine and the speed ratio of the transmission, and according to predetermined relations among the actual drive force, the at least two quantities, the rate of variation in the speed of the engine and the speed ratio.

According to another advantageous embodiment of the invention, the first determining means determines a target speed ratio of the transmission and a target output torque of the engine for obtaining the determined target drive force, according to a predetermined relation among the target speed ratio, the target output torque and the target drive force, the adjusting means comprising speed-ratio adjusting means the controlling the speed ratio of the transmission so that the speed ratio coincides with the target speed ratio thereof, and further comprising engine-output adjusting means for controlling an amount of fuel supply to the engine for obtaining the target output torque of the engine.

In the above embodiment, the engine-output adjusting means may be adapted to supply the controlled amount of fuel to the engine, determine an amount of air supply to the engine based on the amount of fuel to obtain a predetermined air-fuel ratio, and supply the determined amount of air to the engine. The air-fuel ratio may be determined based on the engine speed, the operating amount of the accelerator pedal and other variables, so that the combustion may be effected in a fuel-lean condition so as to emit exhaust gases as clean as possible, or so that the stoichiometric air-fuel ratio may be established.

Preferably, the first determining means is constituted by a first microcomputer, the speed-ratio adjusting means is constituted by a second microcomputer, and the engine-output adjusting means is constituted by a third microcomputer.

The adjusting means, which may comprise the three separate microcomputers, may be adapted to control the actual drive force into agreement with the target drive force, by primarily controlling either the engine output or the speed ratio of the transmission, or alternatively by controlling the engine output and the speed ratio in such a manner as to utilize in combination the characteristics of the engine output and the speed ratio of the transmission, which characteristics are different in terms of their influences on a rate of change in the drive force of the vehicle.

According to a further embodiment of the invnetin, the first determining means varies the actual drive force along a predetermined pattern.

The output detecting means for detecting a currently required output of the vehicle may be adapted to detect an opening angle of a throttle valve or other variables, in place of the operating amount of the accelerator pedal. Such variables should be varied as a function of the amount of operation of the acceleration pedal by the operator, that is, should reflect the intention of the operator in relation to the desired output of the vehicle.

Although a drive force of the vehicle is equal to a drive torque of a drive axle divided by a radius of the drive wheels, it will be understood that the radius of the drive wheels is constant and therefore the term "drive force" used herein may be replaced by the term "drive torque".

BRIEF DESCRIPTION OF THE DRAWING

The specific nature of the invention, as well as other objects, features and advantages thereof, will become apparent from the following detailed description of preferred embodiments of the invention, when considered in connection with the accompanying drawing, in which.

DETAILED DESCRIPTION OF THE PREFERRED EMBODIMENTS

Referring to the accompaning drawing, preferred embodiments of the invention will be described in detail.

Figure 1:
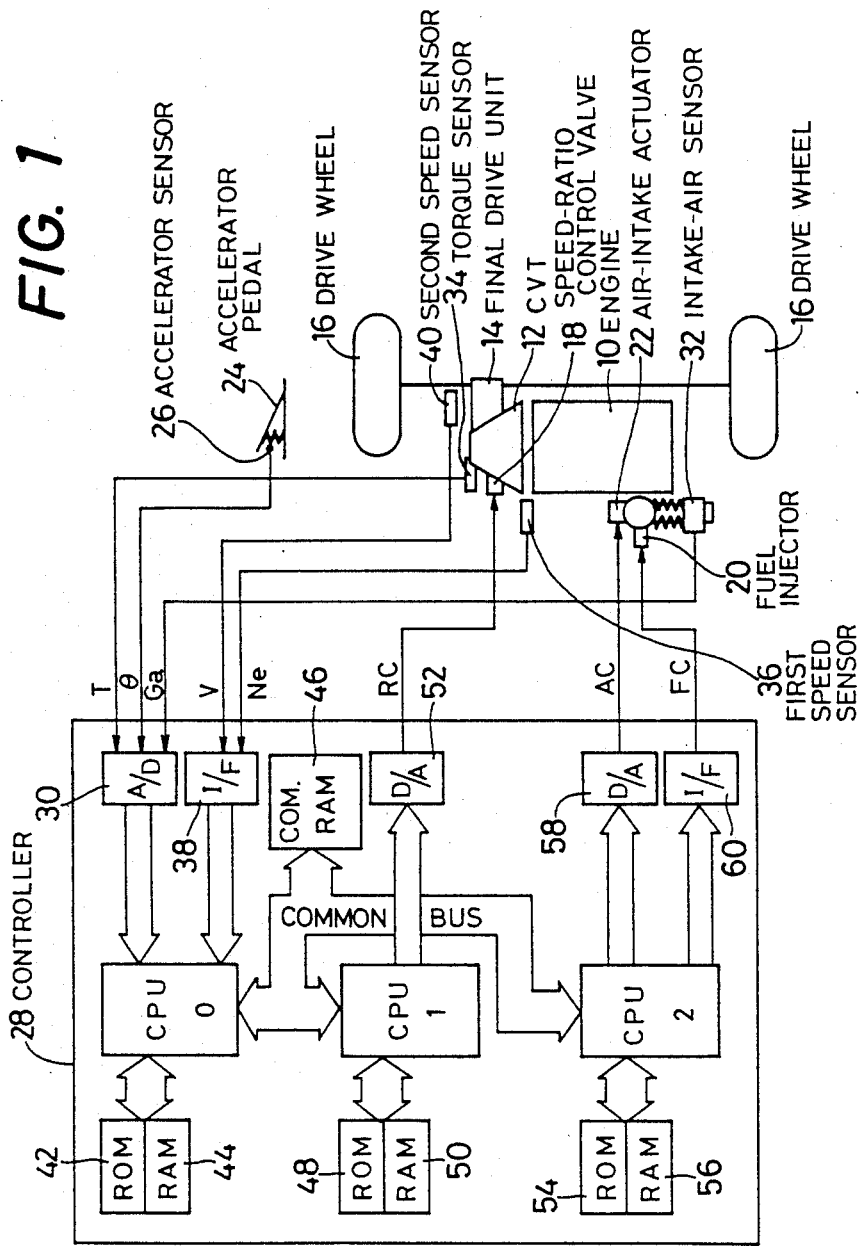
FIG. 1 is a schematic block diagram of one embodiment of a control apparatus of the invention.

There is shown in FIG. 1 a continuously variable transmission 12 (hereinafter referred to as "CVT") which is operatively connected to an engine 10 of an automotive vehicle through an electromagnetic or centrifugal clutch, a fluid coupling clutch, or any other suitable clutch (not shown). This CVT 12 comprises: an input shaft connected to the engine 10; a first variable-diameter pulley provided on the input shaft; an output shaft connected to a final drive unit 14; a second variable-diameter pulley provided on the output shaft; a transmission belt connecting the first and second variable-diameter pulleys; and other elements. A typical constructional arrangement of such an infinitely variable transmission is disclosed in Japanese Patent Application which was laid open 1982 under Publication No. 57-137757. The CVT 12 serves to transmit the output of the engine 10 to the final drive unit 14 and to drive wheels 16, such that a speed ratio of the input shaft to the output shaft is infinitely or steplessly variable. The CVT 12 is provided with a hydraulic cylinder for changing the width of a V-groove of the second variable-diameter pulley of the output shaft. This hydraulic cylinder is activated under the control of a suitable control device (not shown), primarily for establishing an optimum pressure of engagement of the transmission belt with the pulleys, according to a torque Ti of the input shaft and to a speed ratio "e" of the CVT 12 (ratio "$e$"=$No/Ni$, where No: speed of the output shaft, and Ni: speed of the input shaft). Another hydraulic cylinder is provided to change an effective diameter of the first variable-diameter pulley on the input shaft, and thereby change the speed ratio "e". The amounts of flow of a working fluid into and from this latter hydraulic cylinder are regulated by a speed-ratio control valve 18. The engine 10 is provided with an intake manifold which has a fuel injector 20 to inject a fuel into an intake air stream for producing an air-fuel mixture. The intake manifold is provided with an air-intake actuator 22 which controls an amount of flow of the intake air into the manifold.

An accelerator sensor 26, and an intake-air sensor 32 are provided to detect an operating amount $\theta$ of an accelerator pedal 24, and an amount of intake air flow Ga into the intake manifold, respectively. A torque sensor 34 detects a torque T of the output shaft of the CVT 12. The sensors 26, 32 and 34 produce signals representing the accelerator operating amount $\theta$, the amount of intake air flow Ga, and the output shaft torque T of the CVT 12, respectively. The output shaft torque of the CVT 12 represents a torque (drive force) of a drive shaft connected to the drive wheels 16, respectively. These signals are applied to an A/D converter 30 of a controller 28. Further, a first speed sensor 36 is provided to detect a speed of the output shaft of the engine 10, i.e., a speed of the input shaft of the CVT 12, while a second speed sensor 40 is provided to detect a speed of the output shaft of the final drive unit 14. These first and second speed sensor 36, 40 supply an interface circuit (I/F circuit) 38 with signals which represent an engine speed Ne of the engine 10, and a vehicle speed V of the vehicle. The second speed sensor 40 serves as detecting means for detecting the speed V of the vehicle.

The controller 28 is constituted by a so-called microcomputer having three CPUs (central processing units), which are CPU 0, CPU 1 and CPU 2. However, the microcomputer may use a single CPU. The CPU 0 is designed to operate primarily for processing input signals from the A/D converter 30 and the I/F circuit 38, according to a program stored in a ROM 42 and by utilizing a temporary storage function of a RAM 44. Outputs of the CPU 0 obtained by processing the input signals are stored in a common RAM 46. The output data to be obtained by the CPU 0 and stored in the common RAM 46 is hereinafter referred to as "common data". The CPU 0, CPU 1, CPU 2 and common RAM 46 are connected to each other by a data bus. The CPU 1 operates to process the common data from the common RAM 46, according to a program stored in a ROM 48 and by utilizing a temporary storage function of a RAM 50, and applies a speed-ratio control signal RC to the speed-ratio control valve 18 via a D/A converter 52. The CPU 2 operates to process the common data from the common RAM 46, according to a program stored in a ROM 54 and by utilizing a temporary storage function of a RAM 56, primarily for determining an amount of fuel supply Gf* to the engine 10, and an amount of intake air supply Ga* to the engine 10. To give these amounts Gf* and Ga*, the CPU 2 applies a fuel-control signal FC to the fuel injector 20 via an I/F circuit 60, and an air-control signal AC to the air-intake actuator 22 via a D/A converter 58.

Figure 2:
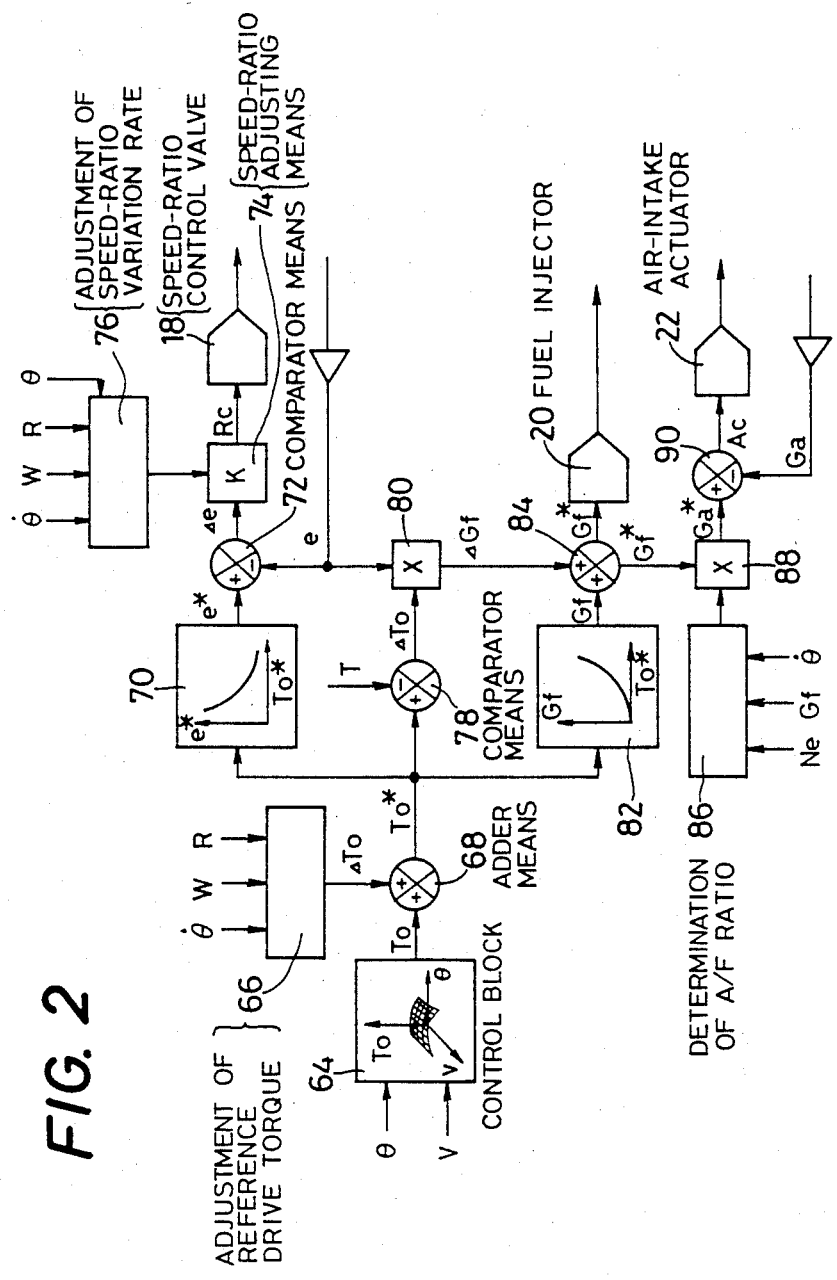
FIG. 2 is a schematic diagrammatic illustration of a controller arrangement of the apparatus of FIG. 1.

Referring next to a diagrammatic illustration of FIG. 2 which shows an arrangement of the controller 28, there is indicated a control block 64 wherein a reference drive torque To (Target drive torque To* before adjustment or compensation) is determined based on the operating amount $\theta$ of the accelerator pedal 24 (corresponding to a required output of the vehicle) and on the vehicle speed V, and according to a predetermined relation of these three variables which is represented by a data map stored in the ROM 42. This relation, which is schematically illustrated in the block 64, is determined by desired drivability characteristics of the vehicle in question. For easy understanding, the present embodiment will be described on the assumption that the operator desires the vehicle to provide a high level of acceleration capability. Actually, however, the operator's intention is also reflected by an amount of operation of a brake pedal for deceleration of the vehicle. Therefore, it is preferred to determine the reference drive torque To based on the operating amount of the brake pedal as well as the operating amount of the accelerater pedal 24.

In a control block 66, the reference drive torque To is adjusted based on an operating amount $\theta$ and an operating speed $\dot\theta$ of the accelerator pedal 24, a total weight W of the vehicle, and a grade R (angle of slope) of the road. More specifically, compensation values $\Delta T\theta$, $\Delta Tw$ and $\Delta Tr$ are determined based on the operating speed $\dot\theta$, vehicle weight W and the road grade R. A sum $\Delta To$ of these values ($\Delta T\theta + \Delta Tw$ and $\Delta Tr = \Delta To$) is added to the reference drive torque To by adder means 68, to obtain a target drive torque To* ($= To + \Delta To$). In the present embodiment, the To-determination block 64, the To-adjustment block 66 and the adding means 68 constitute means for determining the target drive torque To*.

Figure 3:
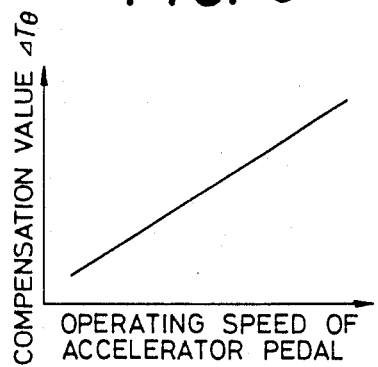
FIGS. 3-5 are graphs showing predetermined relations which are stored in memory and used in the controller arrangement of FIG. 2 for adjusting a target drive torque.
Figure 4:
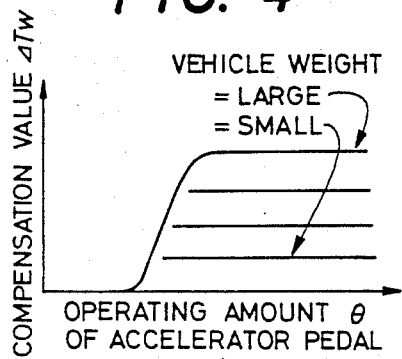
Figure 5:
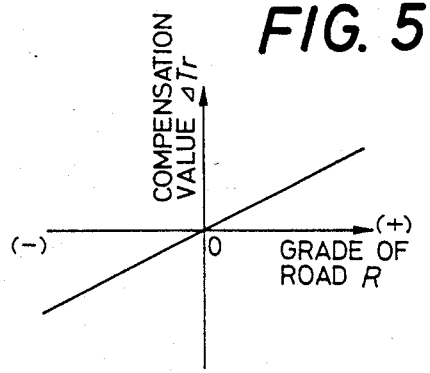

The determination of the compensation values $\Delta T\theta$, $\Delta Tw$ and $\Delta Tr$ in the block 66 is made according to predetermined relations as shown in FIGS. 3-5, for example. However, one or two, or even all of these three compensation factors may be ignored, depending upon a desired degree of compensation of the reference drive torque. The operating speed $\dot\theta$ of the accelerator pedal 24 is determined based on a rate of variation in the operating amount $\theta$ represented by the signal provided by the accelerator sensor 26. The vehicle weight W and the road grade R may be directly detected by a load sensor provided in a suspension system of the vehicle, and a grade or slope sensor disposed at a suitable position on the vehicle. In this embodiment, however, the weight W and the grade R are calculated based on a detected drive force F of the vehicle ($F = T/r$, where r: radius of the drive wheels 16), on the detected vehicle speed V and on a detected acceleration value $\alpha$, in the following manner.

As is well known in the art, the dynamic characteristic of a vehicle is expressed by an equation (2), wherein the first, second, third and fourth terms of the right member represent, respectively: a rolling resistance; wind loss resistance; grade resistance; and an acceleration force effectively exerted to the vehicle. Suppose the road grade (angle of slope) is smaller than 22 degrees, sin R = R, and $\mu r \approx 0.01$. Since $\mu rW$ is almost zero ($\mu rW \approx 0$), the equation (2) is converted into an equation (3), which in turn is converted into an equation (4).

$$F = \mu r W + \mu a S V^2 + W \sin R + C1 W(1 + \sin R)\alpha \quad (2)$$

where,
$\mu r$: coefficient of rolling
$\mu a$: coefficient of wind loss
S: Cross sectional area of the vehicle $$F = \mu a \cdot S V^2 + WR + C1 W(1 + R)\alpha \quad (3)$$

$$F' = A \cdot \alpha + B \quad (4)$$

where, $$F' = F - \mu a \cdot S V^2 \quad (5)$$

$$A = C1 W(1 + R) \quad (6)$$

$$B = WR \quad (7)$$

while the vehicle is running, the values F' and $\alpha$ are sampled to obtain ($\alpha 1$, F'1), ($\alpha 2$, F'2), ... ($\alpha N$, F'N), wherein N represents the number of the values which are sampled. The obtained values $\alpha N$ and F'N are substituted for $\alpha$ and F' in the equation (4). Consequently, equations (8) and (9) are obtained, and values A and B are calculated from the equations (8) and (9). An equation (10) is obtained by deleting R from the equations (6) and (7). The vehicle weight W is obtained from the obtained values A and B and the equation (10). In this connection, it is noted that the wind loss resistance ($\mu a \cdot SV^2$) of the vehicle is extremely small and may be ignored where the vehicle running speed V is comparatively low.

$$A \sum_{i=1}^{N} \alpha i^2 + B \sum_{i=1}^{N} \alpha i = \sum_{i=1}^{N} \alpha i \cdot Fi' \quad (8)$$

$$A \sum_{i=1}^{N} \alpha i + B \cdot N = \sum_{i=1}^{N} Fi' \quad (9)$$

$$W = \frac{A}{C1} - B \quad (10)$$

Then, an equation (11) is obtained from the equations (10) and (2).

$$R = (F - \mu a S V^2 - C1 W\alpha)/W(1 + C1\alpha) \quad (11)$$

The road grade R (angle of slope) is obtained by incorporating the vehicle weight W obtained from the equation (10) into the equation (11). The road grade R may be given by incorporating the previously obtained values A and B into an equation which is obtained by deleting the value W. If the torque sensor 34 is not used, the drive force F may be obtained based on the following equation (12).

$$F = (Te - Tp - C2 Ie \dot{Ne} - C2 It \dot{Ni}) \cdot \eta / er \quad (12)$$

where,
   i.e.: moment of inertia of the engine 10
   It: moment of inertia of the input shaft of the CVT 12
   $\eta$: efficiency of transmission
   Tp: torque for actuating a hydraulic pump
   e: speed ratio of the CVT 12
   r: radius of the drive wheels 16
   $\dot{Ne}$: acceleration of the engine 10
   $\dot{Ni}$: acceleration of the input shaft of the CVT 12
   Te: output torque of the engine 10

The output torque "Te" of the engine 10 is determined based on a throttle opening angle and the engine speed Ne, according to a predetermined relation of these three variables. The throttle opening angle may be replaced by any suitable quantity which represents a required output of the engine, such as the operating amount $\theta$ of the accelerator pedal 24, or the amount of fuel or air supply to the engine 10.

Referring again to FIG. 2, a control block 70 indicates the determination of a target speed ratio e* based on the target drive torque To* and according to a predetermined relation between the values To* and e*, which relation is stored in the ROM 48. Subsequently, comparator means 72 compares the target speed ratio e* with an actually detected speed ratio "e", in order to calculate an error $\Delta$e. The error $\Delta$e is applied to speed-ratio adjusting means 74. The adjusting means multiples the error $\Delta$e by a gain K, and applies to the speed-ratio control valve 18 the speed-ratio control signal RC ($=K\cdot\Delta$e) so that the error $\Delta$e is zeroed. The relation between the values To* and e* used in the control block 70 is predetermined so that a difference between the target drive torque To* and the detected drive torque T is reduced.

Figure 6:
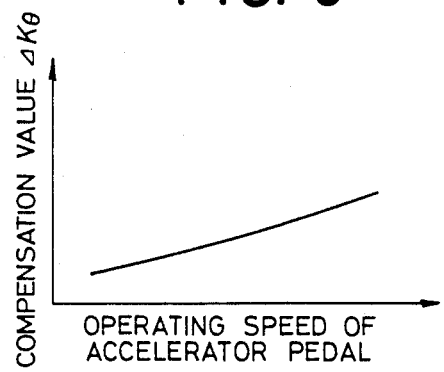
FIGS. 6-8 are graphs showing predetermined relations which are stored in memory and used in the controller arrangement of FIG. 2 for adjusting a rate of variation in the speed ratio of a continuously variable transmission.
Figure 7:
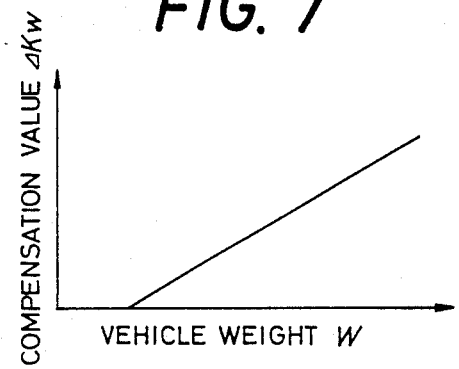
Figure 8:
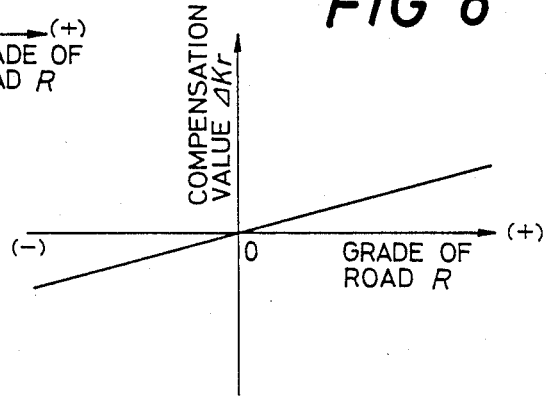

In a control block 76 for adjusting a rate of variation in the speed ratio "e", the gain K given by the speed-ratio adjusting means 74 is adjusted based on the operating speed $\dot\theta$ of the accelerator pedal 24, the weight W of the vehicle, and the road grade R. More specifically, compensation values $\Delta K\theta$, $\Delta Kw$ and $\Delta Kr$ are determined based on the operating speed $\dot\theta$, vehicle weight W and the road grade R, and according to predetermined relations are indicated in FIGS. 6-8, for example. A sum of these values ($\Delta K\theta + \Delta Kw$ and $\Delta Kr$) is added to a reference gain Ko, whereby the gain K is adjusted ($K=Ko+\Delta K\theta+\Delta Kw+\Delta Kr$), depending upon the input variables $\dot\theta$, W and R. Since the gain K determines the magnitude of the signal RC, the adjustment of the gain K in the block 76 results in adjusting the rate at which the speed ratio "e" is varied. However, these compensation values may be ignored as needed.

Comparator means 78 compares the target drive torque T with a currently detected drive torque To which is represented by a signal from the torque sensor 34, and obtains an error $\Delta$To between the target drive torque To* and the detected drive torque T. The error $\Delta$To is applied to multiplier means 80, which multiples the error $\Delta$To by the currently detected speed ratio "e", and obtains a compensation value $\Delta$Gf for adjusting the fuel supply to the engine 10. This compensation value $\Delta$Gf is an adjusting amount of the fuel supply for reducing the error $\Delta$To to zero. While the error $\Delta$To may be zeroed by adjusting the target speed ratio e* of the CVT 12, it is preferred that a target fuel supply amount Gf* be adjusted, for improving responses of the engine 10 and the CVT 12.

In a control block 82, a reference fuel supply amount Gf is determined based on the target drive torque To*, and according to a predetermined relation therebetween which is stored in the ROM 54. The reference fuel supply amount Gf from the control block 82, and the compensation value $\Delta$Gf are applied to adder means 84, which determines the target fuel supply amount Gf* by adding the inputs Gf and $\Delta$Gf. According to this target fuel supply amount Gf*, the corresponding amount of fuel is injected by the injector 20 into the intake manifold of the engine 10. the relation used in the block 82, between the target drive torque To* and the reference fuel supply amount Gf, is predetermined so that the target drive torque To* is obtained. In other words, the relation in question is for determining a target or optimum output torque of the engine 10 which gives the target drive torque To*. This will be understood because the relation is obtained by combining a relation between the target output torque of the engine 10 and the target drive torque To*, and a relation between the target or optimum fuel supply amount Gf* and the optimum output torque of the engine. Since the output torque of the engine 10 is generally closely related to the amount of fuel supplied to the engine 10, it may be considered that the target fuel supply amount Gf* substantially represents the target output torque of the engine 10.

A/F ratio determining means 86 determines an A/F ratio of the air-fuel mixture, based on the current speed Ne of the engine 10, the reference fuel supply amount Gf and the operating speed $\dot\theta$ of the accelerator pedal 24, and according to a predetermined relation stored in the ROM 54. This relation is determined so as to achieve stable combustion of an air-fuel mixture in a fuel-lean condition for emission of clean exhaust gases, that is, to permit the engine to operate at the stoichiometric air-fuel (A/F) ratio. The A/F ratio determined by the A/F ratio determining means 86 is multiplied by the target fuel supply amount Gf*, by multiplier means 88, and thus the target air supply amount Ga* is determined. If the A/F ratio is determined to be 20:1(20/1), for example, the target air supply amount Ga* is determined to be 20 times as much as the target fuel supply amount Gf*. The target air supply amount Ga* is compared, by comparator means 90, with the current air supply amount Ga which is represented by a signal from the intake-air sensor 32. The comparator means 90 applies to the air-intake actuator 22 the signal AC which corresponds to an error $\Delta$Ga between the target and detected air supply amounts Ga* and Ga, so that the error $\Delta$Ga is zeroed.

As described above, the actual drive torque To may be controlled so as to coincide with the target drive torque To*, by changing the target speed ratio e* and the target fuel supply amount Gf* in suitable degrees with respect to each other, which are determined in order to provide a compromise between the fuel economy (specific fuel consumption) and the drivability of the vehicle. The To*-e* relation used in the control block 70, and the To*-Gf relation used in the control block 82, are determined so as to accomplish the above-indicated compromise.

The operation of the control apparatus constructed as described hitherto will be described by reference to flow charts of FIGS. 9-12.

Figure 9:
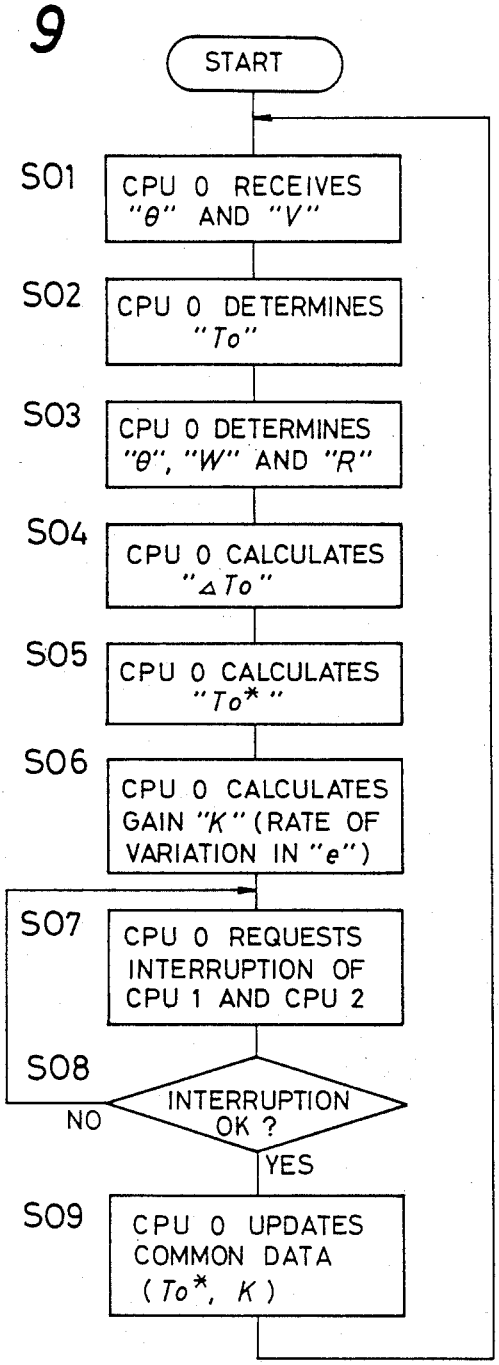
FIGS. 9, 10A, 10B, 11, 12 are flow charts showing the operation of the apparatus of FIG. 1.

Referring to FIG. 9, the CPU 0 first executes step S01 wherein the CPU 0 receives output signals of the accelerator sensor 26 and the second speed sensor 40, and stores the operating amount $\theta$ of the accelerator pedal 24 and the vehicle speed V in the RAM 44. Then, the CPU 0 goes to step S02 to determine the reference drive torque To based on the accelerator operating amount $\theta$ and the vehicle speed V. Step S02 is followed by step S03 wherein the CPU 0 executes a calculation routine of FIG. 10 for determining an operating speed $\dot\theta$ of the accelerator pedal 24 (a rate of variation in the operating amount $\theta$), a total weight W of the vehicle and a road grade R.

Figure 10A:
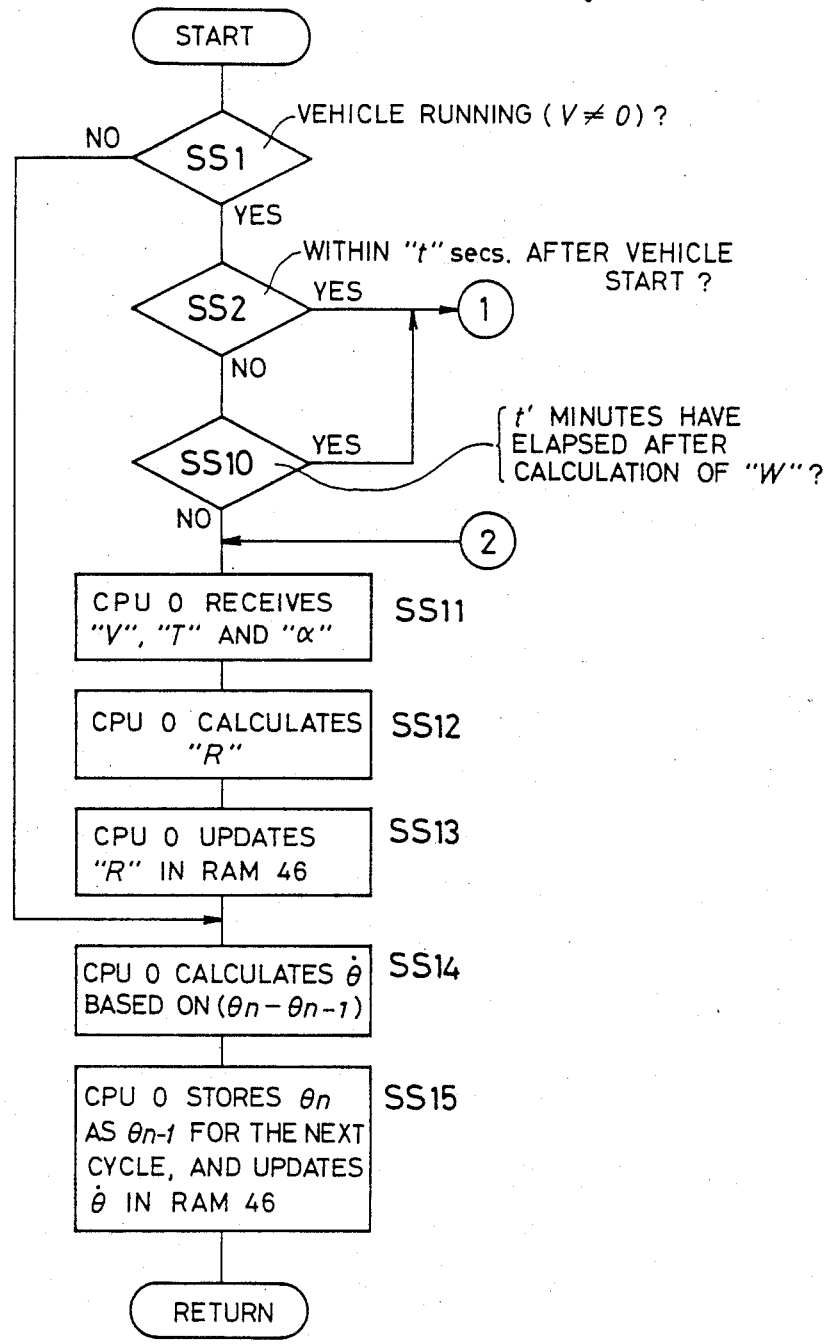
Figure 10B:
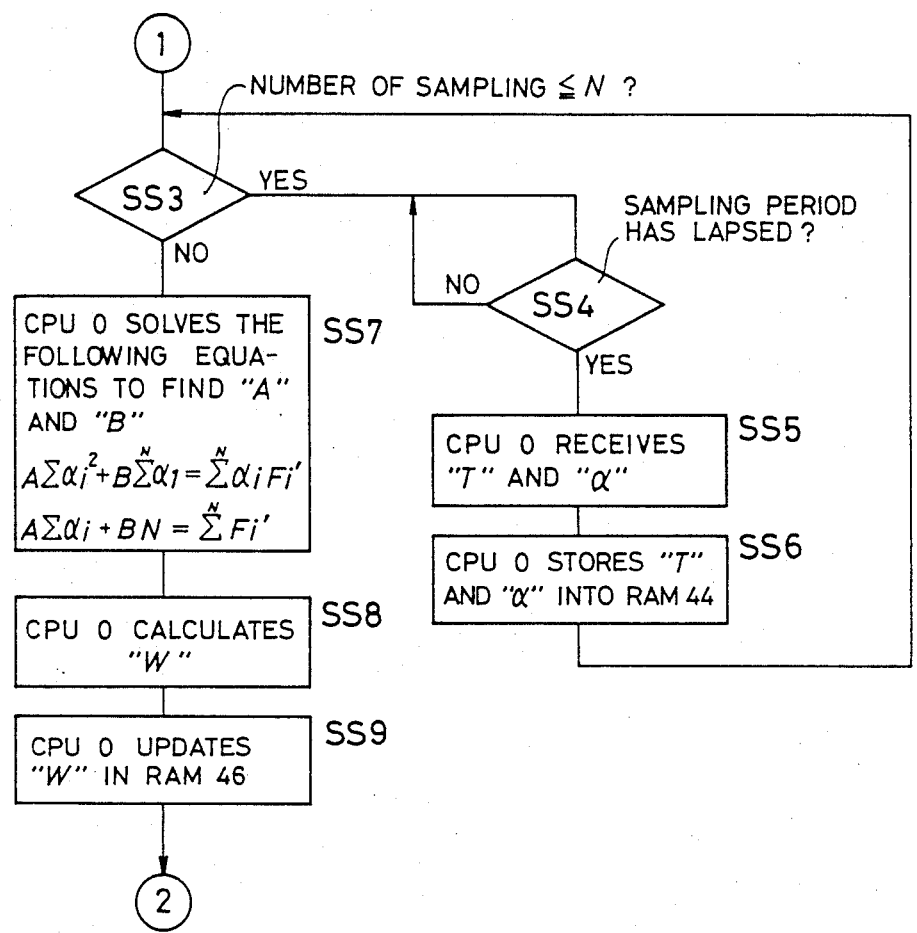

Described more specifically referring to FIG. 10A and 10B showing the calculation routine, step SS1 is first executed to check if the vehicle is currently running (if the vehicle speed V is not zero). If the vehicle is not running, the CPU 0 goes to step SS14 which will be described. If the vehicle is running, step SS1 is followed by step SS2 to check if the time lapse after the start of the vehicle is within a predetermined time duration, "t" secs. (e.g., several seconds). If the time lapse after the vehicle has been started is within the predetermined time duration of "t" secs., the CPU 0 goes to step SS3 to check if the number of sampling of "to" and "α" is equal to or smaller than "N". Since the number of sampling has not reached the value "N" within the predetermined time duration of "t" secs., the CPU 0 goes to step SS4 to check if a predetermined sampling period has lapsed. If not, the CPU 0 repeats the execution of step SS4 until the sampling time has lapsed. If the sampling period has lapsed, step SS4 is followed by step SS5 to receive the current drive torque T and the current acceleration α. Then, the CPU 0 goes to step SS6 to store the received drive torque T and acceleration α into the RAM 44. The above steps SS3 through SS6 are repeated at the sampling frequency until the number of sampling has reached the predetermined value "N", whereby the "N" sets of data (T, α) are stored in the RAM 44.

As soon as the number of the sampled and stored data (T, α) has reached the predetermined value "N", the CPU 0 executes step SS7 to find values "A" and "B" based on the stored data (T, α) and the equations (8) and (9) previously indicated. Step SS7 is followed by step SS8 wherein the values "A" and "B" are incorporated into the equation (10) and thus the vehicle weight "W" is calculated. In the next step SS9, the data "W" already stored in the common RAM 46 is replaced by the newly obtained value "W". Subsequently, the CPU 0 goes to step SS11. Step SS10 following step SS2 is provided for checking if a predetermined time duration of t' minutes has lapsed after the vehicle weight "W" has been calculated. When the predetermined time duration of t' minutes has passed, the CPU 0 goes to steps SS3–SS9. Therefore, the data "W" in the common RAM 46 is updated every t' minutes.

In step SS11, the CPU receives the current vehicle speed V, drive torque T and acceleration α. Step SS11 is followed by step SS12 in which the CPU 0 calculates the road grade R by incorporating the data V, T and α received in step SS11 and the vehicle weight W calculated in step SS8, into the equation (11) previously indicated. Then, the CPU 0 goes to step SS13 to replace the data R in the common RAM 46 with the newly calculated value "R". Step SS13 is followed by step SS14 to calculates a rate of variation $\dot{\theta}$ in the operating amount $\theta$ of the accelerator pedal 24 ($\dot{\theta} = \Delta\theta/Tc$, where Tc represents a control cycle time) based on a difference $\Delta\theta$ betwee the operating amount $\theta n-1$ in the preceding control cycle and the operating amount $\theta n$ in the current control cycle. Then, step SS14 is executed to store the present operating amount $\theta n$ as $\theta n-1$ for the next control cycle, and replaces the data $\dot{\theta}$ in the common RAM 46 with the data $\dot{\theta}$ newly obtained in step SS14.

Referring back to FIG. 9, the CPU 0 goes from step S03 to S04 which corresponds to the previously discussed control block 66 for adjusting the drive torque To and determines the target drive torque To*. Namely, the compensation value ΔTo ($\Delta T\theta + \Delta Tw + \Delta Tr$) is calculated based on the current values of Δ, W and R which have been calculated in step S03, according to the calculation routine of FIG. 10 described above. Step S04 is followed by step S05 in which the adder means 68 adds the torque compensation value ΔTo to the reference drive torque To, and thereby obtains the target drive torque To* (=To+ΔTo). Successively, the CPU 0 goes to step S06 which corresponds to the control block 76 for adjusting the gain K (for adjusting the speed ratio variation rate ).

Namely, the gain K ($=Ko + \Delta K\theta + \Delta Kw + \Delta Kr$) of the speed-ratio adjusting means 74 is obtained by adding the compenation values ΔKθ, ΔKw and ΔKr to the reference gain Ko. Step S06 is followed step S07 wherein the CPU 0 requests the CPU 1 and CPU 2 to interrupt their operations. Then, step S08 is executed to check if the interruption request is granted or not. These steps S07 and S08 are repeated until the interruption request is granted. when the request is granted, the CPU 0 then goes to step S09 to update the common data To* and K stored in the common RAM 46, that is, to replace the already stored data To* and K with the data which have been newly obtained in steps S05 and S06, respectively. Thus, the primary function of the CPU 0 is to calculate and update the common data (To* and K). It is noted that the common RAM 46 also stores the current speed ratio "e", current drive torque T, etc. which are detected in suitable steps (not shown).

Figure 11:
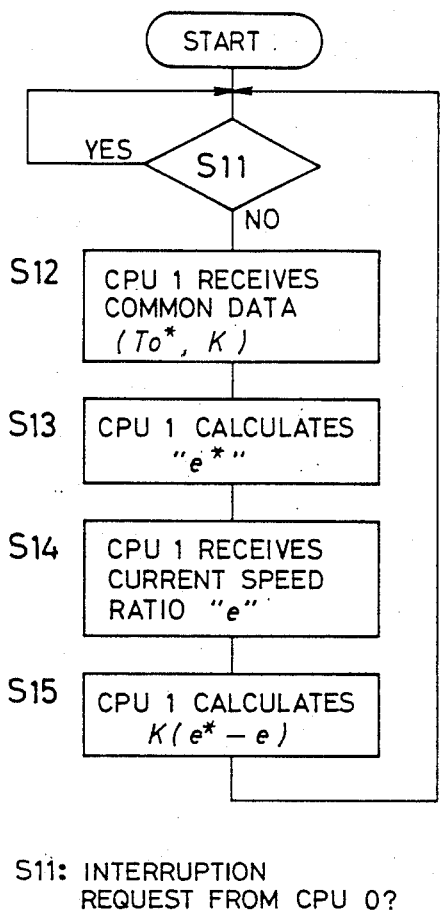
Figure 12:
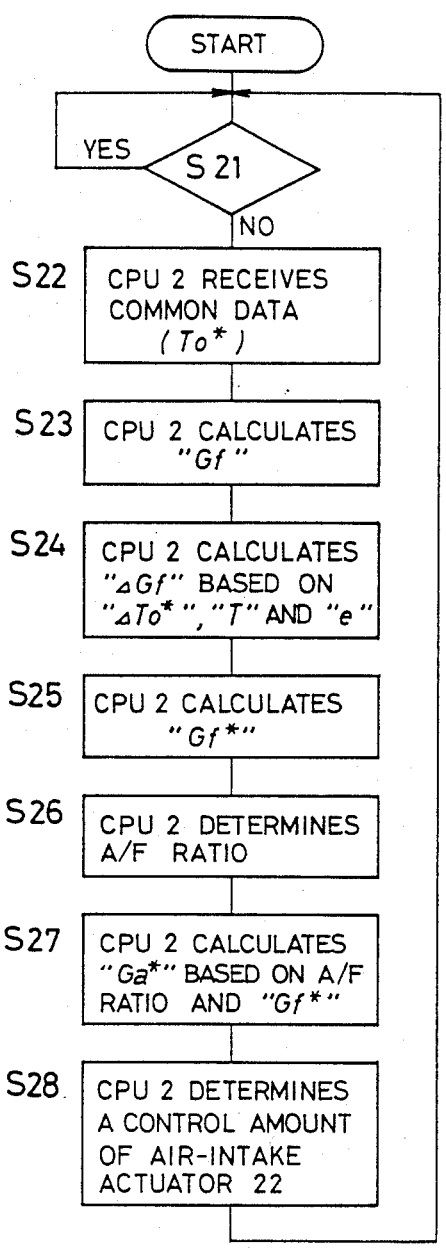

The CPU 1 is adapted to execute steps shown in FIG. 11. More particularly, step S11 is performed to check if there is an interruption request by the CPU 0. If the interruption request is present, the step S11 is executed repeatedly until the request becomes absent. If the interruption request is not present, step S11 is followed by step S12 wherein the CPU 1 receives the common data (To*, K) from the common RAM 46. Subsequently, the CPU 1 goes to step S13 which corresponds to the control block 70, to determine the target speed ratio e* based on the target drive torque To*, and according to the predetermined relation. Then, the CPU 1 executes step S14 to receive the currently detected speed ratio "e". Step S14 is followed by step S15 to determine the speed-ratio control value, i.e., K(e*−e), and applies the speed-ratio control signal RC corresponding to the control value, to the speed-ratio control valve 18. Thus, the CPU 0 is designed primarily for controlling the speed ratio "e" of the CVT 12 so that the current ratio "e" may coincides with the target speed ratio The CPU 2 is adapted to accomplish steps shown in FIG. 12, wherein steps S21 and S22 are similar to steps S11 and S12 of FIG. 11 performed by the CPU 1. That is, the CPU 2 receives the common data (To*) when there is not an interruption request by the CPU 0. Step S22 is followed by step S23 corresponding to the control block 82, in which the CPU 2 calculates the reference fuel supply amount Gf based on the target drive torque To* and according to the predetermined relation. Subsequently, the CPU goes to step S24 corresponding to the comparator means 78 and the multiplier means 80, in order to obtain the compensation value ΔGf for the fuel supply amount, based on the target drive torque To*, the current drive torque T and the current speed ratio "e". Stated in more detail, the error ΔTo between the target and current drive torques To* andT is first obtained by the comparator means 78, and the compensation value ΔGf is obtained by the multiplier means 80 by multiplying the error ΔTo by the current speed ratio "e". For instance, this compensation amount ΔGf of the fuel is given to compensate for a balance ΔTo to the target drive torque To*. Then, the CPU 2 goes to step S25 corresponding to the adder means 84, in which the compensation amount ΔGf is added to the reference fuel supply amount Gf, whereby the target fuel supply amount Gf* is obtained.

Successively, the CPU 2 goes to step S26 corresponding to the A/F ratio determining means 86. In this step S26, the air-fuel (A/F) ratio is determined based on the current speed Ne of the engine 10, the reference fuel supply amount Gf and the operating amount θ of the accelerator pedal 24. Step S26 is followed by step s27 corresponding to the muliplier means 88, in order to calculate the target air supply amount Ga* by multiplying together the A/F ratio and the target fuel supply amount Gf*. Successively, step 28 corresponding to the comparator means 90 is executed to obtain an error between the target and current air supply amounts Ga* and Ga. the air-control signal Ac corresponding to the error is applied to the air-intake actuator 22, so that the error is zeroed. As described above, the CPU 2 is adapted primarily for controlling the amount of the fuel supply to the engine 10 so as to reduce the error between the target drive torque To* and the actually detected drive torque T, and for controlling the air-intake actuator 22 so that the actual air intake amount Ga coincides with the target air supply amount Ga* which is determined by the A/F ratio and the target fuel supply amount Gf*.

Figure 13:
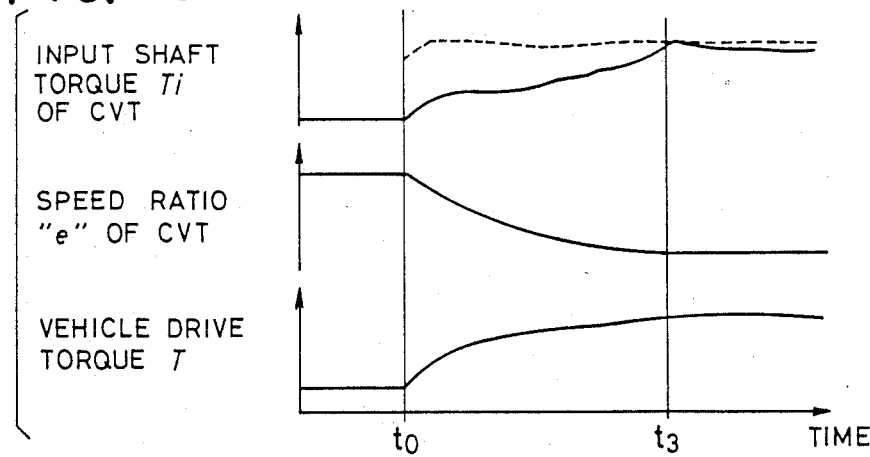
FIG. 13 is a timing chart relating to the operation of the apparatus of FIG. 1.

In the present embodiment of the control apparatus of the invention which has been described, the target drive torque To* is determined in relation to the operating amount θ of the accelerator pedal 24, and the speed ratio "e" of the CVT 12 is varied in response to a variation in the target drive torque To* while at the same time the amount of the fuel to the supplied by the fuel injector 20 to the engine 10 is determined so that a difference between the target drive torque To* and the currently detected drive torque T is reduced. This arrangement permits the vehicle to provide the target drive torque To* corresponding to the operating amount θ of the accelerator pedal 24, within a relatively short time during acceleration of the vehicle, and therefore assures improved drivability, i.e., improved response to the amount of operation of the accelerator pedal 24. FIG. 13 is a timing chart showing variations in the drive torque T of the vehicle, speed ratio "e" of the CVT 12 and torque Ti of the input shaft of the CVT 12, while the vehicle is accelerated.

Since the response of the CVT 12 to a command to change the speed ratio "e" is lower than the response of the engine 10 to a variation in the fuel supply amount, the final accurate control to zero the error ΔTo between the target drive torque To* and the currently detected drive torque T is accomplished primarily by regulating the amount of fuel to be supplied to the engine 10. Accordingly, the drive force corresponding to the accelerator operating amount θ may be obtained before the speed ratio "e" of the CVT 12 has been made constant at a steady level. In view of the fact that a higher specific fuel consumption is obtained when the speed ratio "e" has reached a steady level, it is preferred to determine the constant K (gain K) used by the speed-ratio adjusting means 74 or in the corresponding step S15 be selected so that the speed ratio "e" may be stabilized as soon as the drive torque T has been stabilized, that is, at a point of time T3 in FIG. 13. In the case where the CVT 12 is sufficiently responsive to a required speed ratio "e", or the vehicle employs other types of infinitely variable transmission which are capable of changing its speed ratio "e" at a sufficiently high rate, it is possible to rely mainly on the regulation of the speed ratio "e" for reducing the error between the target and current drive torque values To* and T to zero. Further, the control of the drive torque T may be achieved, but with reduced results, by using only one of the two means which are utilized in the present embodiment, that is, by controlling either the speed ratio "e" of the transmission or the amount of fuel supply to the engine 10.

The predetermined relations used in the control blocks 70 and 82 (steps S13 and S23, respectively) may be determined to give intended weights to the control of the speed ratio "e" and the control of the fuel supply amount, with respect to each other. Accordingly, it is possible that plural sets of relations (functions) of different characteristics (curves) are stored (in the RAM 44) and available for the control of the speed ratio "e" and for the control of the fuel supply amount, and an appropriate one set of the corresponding relations is selected to meet a required proportion of the control weights to be given to the speed ratio "e" and the fuel supply amount. It is also possible to provide the CPU 0 with means for calculating the amount of fuel consumption, and updating memory maps for controlling the speed ratio "e" and the fuel supply amount, so that the fuel consumption may be minimized.

In the illustrated embodiment, the target fuel supply amount Gf* is determined before the target air supply amount Ga* is determined based on the determined target fuel supply amount Gf* and the A/F ratio. Since the output torque of the engine 10 is more responsive to an amount of the fuel to be supplied than to an an amount of the air-fuel mixture, the control of the drive torque may be effected comparatively easily. Further, the air-fuel ratio of the air-fuel mixture may be adjusted for stable combustion, depending upon the operating speed θ of the accelerator pedal. If a supercharger is provided in the intake manifold of the engine 10, it is necessary that the amount of intake air into the supercharger be also detected by the intake-air sensor 32 and the supercharger itself be controlled as an air-intake actuator.

The controller 28 of the illustrated embodiment permits the entire control system to be operated efficiently and smoothly without delay, because the controller 28 uses the three central processing units: CPU 0 functioning primarily for performing complicated operations to update the common data; CPU 1 functioning primarily for controlling the speed ratio "e" of the CVT 12; and CPU 2 functioning primarily for controlling the amount of fuel supply to the engine 10.

Further, the illustrated embodiment is adapted to adjust the determined target drive torque To*, based on the operating speed θ of the accelerator pedal 24, total vehicle weight W and road grade R (angle of slope), so that the target speed ratio e* and the target fuel supply amount Gf* are adjusted so as to increase the speed of the engine 10 when the above-indicated variables θ, W and R are increased. In addition, the gain K which corresponds to the rate of variation in the speed ratio "e" is adjusted also based on the variables θ, W and R, so that the speed ratio "e" of the CVT 12 may be varied with a high response, whereby the drivability of the vehicle is further enhanced.

As shown in FIG. 4, the reference drive torque To is increased according to an increase in the vehicle weight W (load), only while the operating amount θ of the accelerator pedal 24 is relatively large, namely, only while the vehicle speed is increased at a relatively high rate. Stated more specifically, the target speed ratio e* is changed to raise or lower the engine speed in response to a change in the vehicle weight W, only while the output required by the operator is relatively high. In other words, the instant control apparatus automatically adjusts the drive torque of the vehicle adequataely to compensate for a change in the vehicle weight W, and therefore eliminates manipulation of the accelerator pedal 24 by the vehicle operator to compensate for the weight change, which manipulation may increase the fuel consumption.

Figure 14:
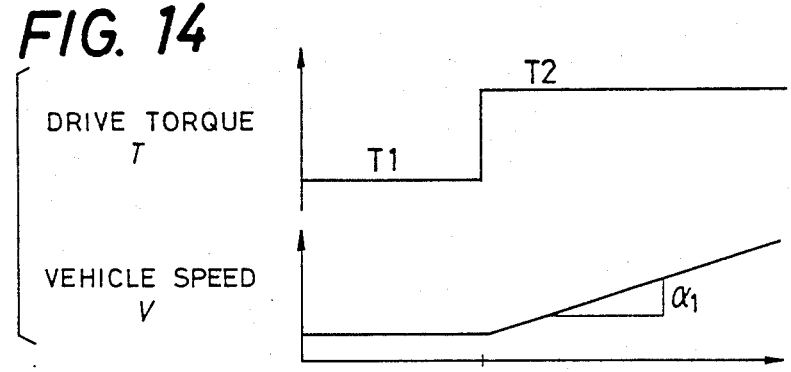
FIGS. 14, 15 and 16 are timing charts for manifesting driving conditions of a vehicle equipped with a conventional control apparatus, when the vehicle is running in a regular mode, with an increased load, and on an upward slope, respectively.
Figure 15:
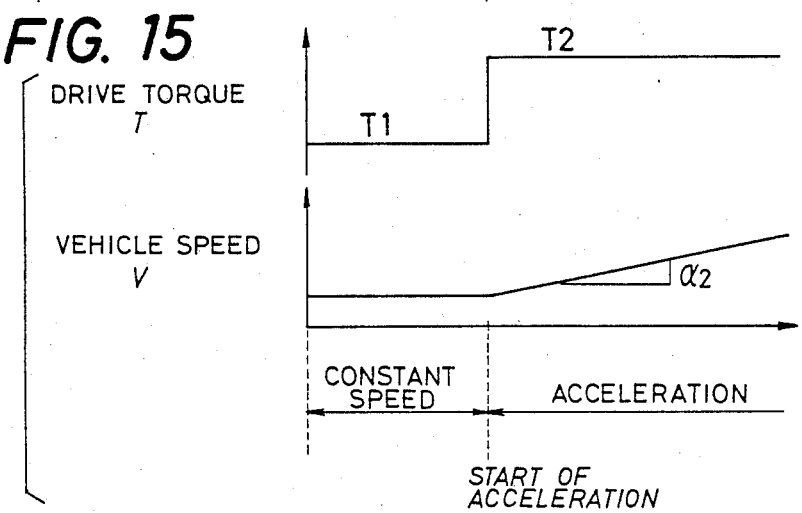
Figure 16:
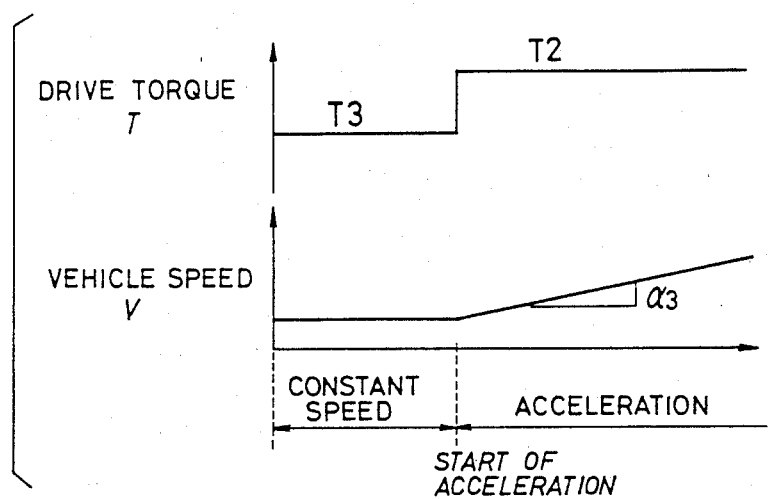

Generally, when the vehicle is accelerated at the end of a constant-speed run where the road grade R is zero and the vehicle weight W is normal, the drive torque of the vehicle is changed from T1 to T2 while the vehicle speed V is increased at an acceleration $\alpha 1$, as indicated in FIG. 14. If a similar acceleration is required with an increased weight (W+$\Delta$W) or on an upward slope of a relatively large grade R, the slope), the drive torque and speed of the vehicle are changed as indicated in FIGS. 15 and 16, repectively. In the former case of FIG. 15 where the vehicle weight W is increased (and the road is level), the vehicle demonstrates the drive torque characteristic identical to that of FIG. 14, but the acceleration $\alpha 2$ is reduced ($\alpha 1 > \alpha 2$). In the latter case of FIG. 16 where the road grade R is a relatively large positive value, The drive torque T3 during the constant-speed run is greater than the drive torque T1 of FIG. 14 (T3>T1), and the acceleration $\alpha 3$ is greater than the acceleration $\alpha$ of FIG. 14. In a conventional control apparatus which exhibits the above-indicated general characteristics, if the target speed ratio e* or the target fuel supply amount Gf* is increased to compensate for a reduction in the acceleration due to an increase in the vehicle weight W, irrespective of the operating amount $\theta$ of the accelerator pedal, the speed of the engine will be increased excessively and the fuel economy is accordingly reduced while the vehicle is running on a level road. In the illustrated embodiment of the control apparatus, however, the compensation for a variation in the vehicle weight is made only while the operating amount $\theta$ of the accelerator pedal 24 is comparatively large. Hence, the illustrated control apparatus does not suffer the inconveniences addressed above.

Figure 17:
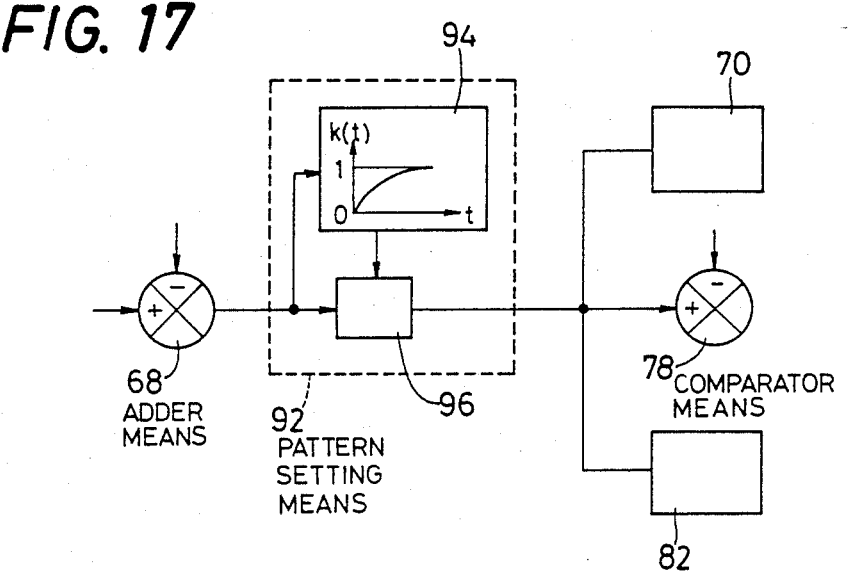
FIG. 17 is a schematic block diagram illustrating an essential part of another embodiment of the invention.
Figure 18:
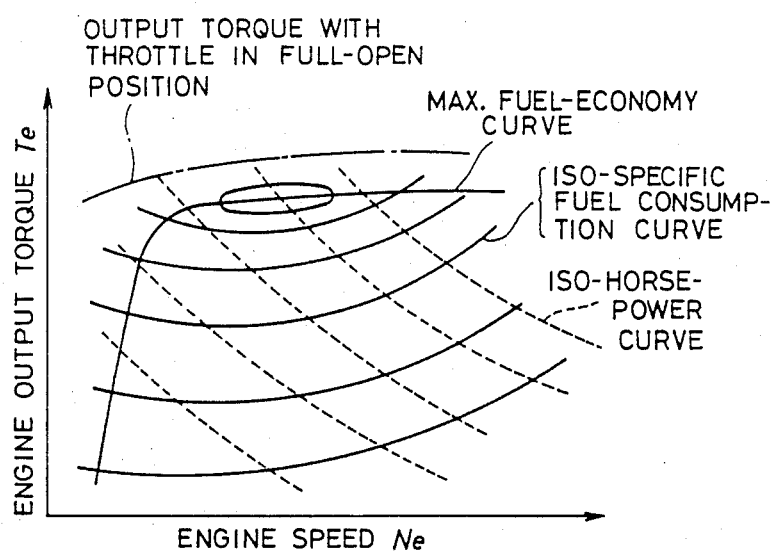
FIG. 18 is a graphical representation indicating a minimum fuel-consumption curve.
Figure 19:
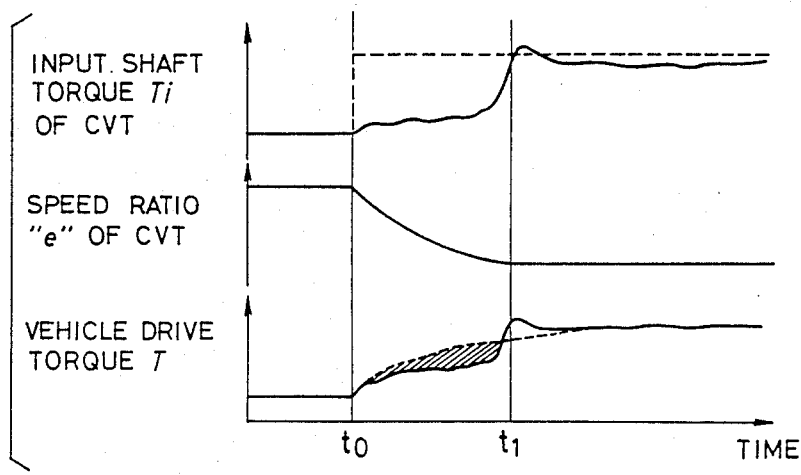
FIGS. 19 and 20 are timing charts indicating acceleration characteristics of a vehicle equipped with a conventional control apparatus.
Figure 20:
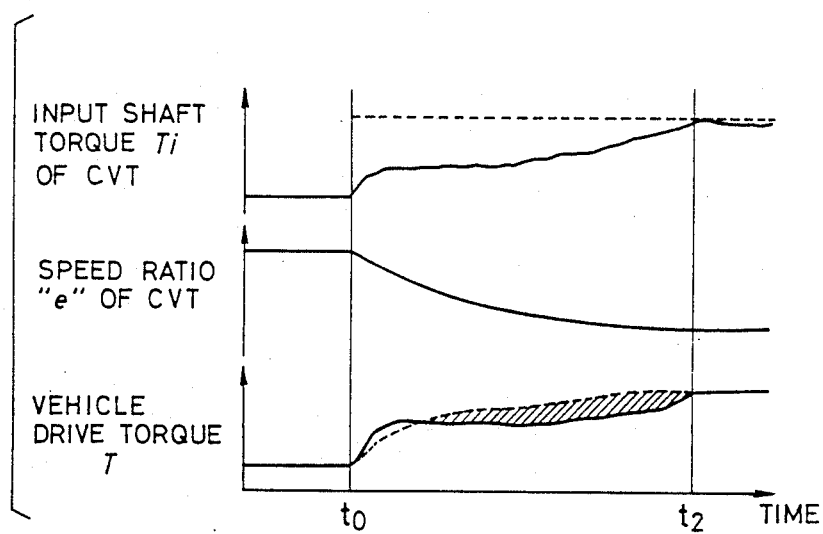

It is possible to provide pattern setting means 92 as indicated in FIG. 17, between the adder means 68 and the comparator means 78 of FIG. 2. The pattern setting means 92 is adapted to vary the output of the target drive torque To* from the adder means 68, according to a predetermined pattern. The pattern setting means 92 consists of pattern generating means 94 generating a function k (t) which is changed according to the predetermined pattern from one value to another within a given length of time, and arithmetic means 96 which varies the target drive torque To* according to the following equation (13) and the function k (t) generated by the pattern generating means 94.

$$To^*(t) = To^*_{n-1} + (To^*_n - To^*_{n-1}) \cdot k(t) \quad (13)$$

where,

To*$_{n-1}$: target drive torque before the variation
To*: target drive torque after the variation With the provision of the pattern setting means 92, the target drive torque To* is changed according to the predetermined pattern and therefore the operation of the control system is stabilized. Such pattern setting means may be provided between the control block 70 and the comparator means 72, and/or between the control block 82 and the adder means 84.

The speed-ratio control and drive-torque control feedback systems may be provided with a differentiating element for restraining vibrations in the systems, or an integrating element for eliminating a steady-state error. further, it is possible to employ a model reference adaptive control system which provides a reference model for regulating the speed ratio and drive torque.

The drive force (drive torque T) of the vehicle may be determined based on the acceleration $\dot{V}$. Since the acceleration $\dot{V}$ of the vehicle is affected by the vehicle weight W and the road grade R, it is desired to use a function $T = f(\dot{V}, W, R)$, for compensating the drive force for variations in the weight W and road grade R.

Figure 21:
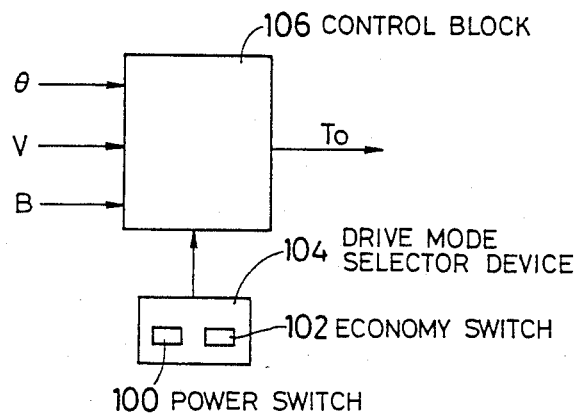
FIG. 21 is a block diagram showing an essential part of a further embodiment of the invention.

It is noted that the operator's intention of controlling the drive force or speed is also reflected by an operating amount "B" of a brake to lower the vehicle speed, or by the selection of the driving mode, e.g., one of POWER and ECONOMY modes which are selected by respective POWER and ECONOMY switches 100, 102 of a MODE selector device 104, as illustrated in FIG. 21. In the light of the above, the control block 64 of FIG. 2 may be replaced by a control block 106 shown in FIG. 21. In the control block 106, the reference drive torque To is determined based on the detected operating amount $\theta$ of the accelerator pedal 24 and the detected vehicle speed V and according to the predetermined relation therebetween, as in the preceding embodiment of FIG. 2. In addition, the control block 106 is adapted to reduce the determined reference drive torque To depending upon the operating amount B of the brake, whereby the drivability of the vehicle during deceleration may be improved. If the MODE selector device 104 is provided, the reference drive torque To is increased when the POWER switch 100 is one, and decreased when the ECONOMY switch 102 is on, so that the intention of the operator reflected by the selection of the driving mode may be reflected on the control of the drive torque. The operating amount B of the brake may be determined by detecting the pressure of the brake fluid, a force of depression on the brake pedal.

Although the actual drive force (drive torque T) of the vehicle is determined baed on the signal from the torque sensor 34, it is possible to determine the drive force based on a signal generated by an acceleration sensor, or based on a rate of acceleration which is calculated from a variation in the vehicle speed V.

While the present invention has been described in detail in its preferred forms with a certain degree of particularlity, it is to be understood that the invention may be embodied with various changes, modifications and improvements which may occur to those skilled in the art, within the spirit and scope of the invention defined in the appended claims.

What is claimed is:

1. A method for controlling an actual drive force of an automotive vehicle equipped with a continuously variable transmission for transmitting an output of an engine to drive wheels, comprising the steps of:
    detecting a currently required output of the vehicle;
    detecting a current speed of the vehicle;
    determining a target drive force of the vehicle based on the detected currently required output of the vehicle and the detected current speed of the vehicle, and according to a predetermined relation among said target drive force, said currently required output and said current speed of the vehicle;
    determining an acutal drive force of the vehicle; and
    comparing the determined target drive force of the vehicle with the determined actual drive force, and controlling at least one of an output of the engine and a speed ratio of the transmission, so that the actual drive force of the vehicle coincides with said determined target drive force.

2. An apparatus for controlling an actual drive force of an automotive vehicle equipped with a continuously variable transmission for transmitting an output of an engine to drive wheels, comprising:

required-output detecting means for detecting a currently required output of the vehicle;

speed detecting means for detecting a current speed of the vehicle;

first determining means for determining a target drive force of the vehicle based on the detected currently required output of the vehicle and the detected current speed of the vehicle, and according to a predetermined relation among said target drive force, said currently required output and said current speed of the vehicle;

second determining means for determining an actual drive force of the vehicle;

adjusting means for comparing the determined target drive force of the vehicle with the determined actual drive force, and controlling at least one of an output of the engine and a speed ratio of the transmission, so that the actual drive force of the vehicle coincides with said determined target drive force.

3. An apparatus according to claim 2, wherein said first determining means determines a reference drive force based on an operating amount of an accelerator pedal and said detected current speed of the vehicle, and adjusts the determined reference drive force based on at least one of quantities representing running conditions of the vehicle, said quantities including an operating speed of said accelerator pedal, an operating amount of a brake, a weight of the vehicle, and a grade of a road on which the vehicle runs.

4. An apparatus according to claim 3, wherein said first determining means determines said reference drive force, further based on at least one of a drive mode of the vehicle selected by a drive mode selector device, and an operating amount of a brake.

5. An apparatus according to claim 2, wherein said second determining means comprises a torque sensor disposed in a power transmission line between an output shaft of said transmission and said drive wheels, said second determining means determining said actual drive force of the vehicle based on a signal generated from said torque sensor.

6. An apparatus according to claim 2, wherein said second determining means determines said actual drive force of the vehicle based on an acceleration of the vehicle.

7. An apparatus according to claim 2, wherein said second determining means determines said actual drive torque based on at least two quantities selected from at least a speed of the engine, an amount of air supply to the engine, and an amount of fuel supply to the engine, and based on a rate of variation in said speed of the engine and the speed ratio of the transmission, and according to predetermined relations among said actual drive force, said at least two quantities, said rate of variation in the speed of the engine and said speed ratio.

8. An apparatus according to claim 2, wherein said first determining means varies said target drive force along a predetermined pattern from a level determined.

9. An apparatus according to claim 2, wherein said first determining means determines a target speed ratio of the transmission and a target output torque of the engine for obtaining said determined target drive force, according to a predetermined relation among said target speed ratio, said target output torque and said target drive force, said adjusting means comprising speed-ratio adjusting means for controlling said speed ratio of the transmission so that said speed ratio coincides with said target speed ratio thereof, and further comprising engine-output adjusting means for controlling an amount of fuel supply to the engine for obtaining said target of output torque of the engine.

10. An apparatus according to claim 9, wherein said engine-output adjusting means supplies said amount of fuel to the engine, determines an amount of air supply to the engine based on said amount of fuel to obtain a predetermined air-fuel ratio, and supplies the determined amount of air to the engine, whereby the output torque of the engine is adjusted.

11. An apparatus according to claim 9, wherein said first determining means is constituted by a first microcomputer, said speed-ratio adjusting means is constituted by a second microcomputer, and said engine-output adjusting means is constituted by a third microcomputer.

* * * * *